United States Patent [19]

Boardman

[11] Patent Number: 5,274,553
[45] Date of Patent: Dec. 28, 1993

[54] TORQUE CONVERTER SLIP RATE BASED SKIP POWER DOWNSHIFT CONTROL STRATEGY

[75] Inventor: Mark D. Boardman, Portage, Mich.

[73] Assignee: Eaton Corporation, Cleveland, Ohio

[21] Appl. No.: 697,814

[22] Filed: May 9, 1991

[51] Int. Cl.$^5$ .............. G06F 15/50; F16D 21/04; B60K 41/04
[52] U.S. Cl. .............. 364/424.1; 74/866; 74/889; 192/0.096; 192/0.092
[58] Field of Search ............ 364/424.1; 74/866, 720, 74/889; 192/3.26, 3.58, 3.57, 3.63, 0.092, 0.096; 123/416

[56] References Cited

U.S. PATENT DOCUMENTS

| | | | |
|---|---|---|---|
| 4,361,060 | 11/1982 | Smyth | 74/866 |
| 4,527,447 | 7/1985 | Richards | 74/866 |
| 4,527,678 | 7/1985 | Pierce et al. | 192/3.58 |
| 4,576,065 | 3/1986 | Speranza et al. | 74/866 |
| 4,595,986 | 6/1986 | Daubenspeck et al. | 364/424.1 |
| 4,614,126 | 9/1986 | Edelen et al. | 74/333 |
| 4,784,019 | 11/1988 | Morscheck | 74/720 |
| 4,852,006 | 7/1989 | Speranza | 364/424.1 |
| 4,860,861 | 8/1989 | Gooch et al. | 192/3.26 |
| 4,877,116 | 10/1989 | Horsh | 192/3.57 |
| 4,896,565 | 1/1990 | Simonyi et al. | 74/889 |
| 4,899,607 | 2/1990 | Stainton | 74/335 |
| 4,916,979 | 4/1990 | Irwin | 74/866 |
| 4,957,194 | 9/1990 | Sawa et al. | 192/0.096 |
| 5,016,176 | 5/1991 | Holbrook et al. | 364/424.1 |
| 5,016,495 | 5/1991 | Takizawa | 74/866 |
| 5,053,963 | 10/1991 | Mack | 364/424.1 |
| 5,088,582 | 2/1992 | Saitou et al. | 192/0.055 |
| 5,089,962 | 2/1992 | Steeby | 74/866 |
| 5,101,943 | 4/1992 | Bulgrien | 192/3.63 |

FOREIGN PATENT DOCUMENTS 0291088 11/1988 Fed. Rep. of Germany .
0312801 4/1989 Fed. Rep. of Germany .
2031075 1/1990 Japan .

OTHER PUBLICATIONS

SAE Paper No. 881830 presented Nov. 1988. Morscheck, The Eaton Ceemat (Converter Enhanced Electronically Managed Automatic Transmission).
SAE Standard J1922.

Primary Examiner—Thomas G. Black
Assistant Examiner—Jacques H. Louis-Jacques
Attorney, Agent, or Firm—H. D. Gordon

[57] ABSTRACT

A power downshift control method/system strategy (FIG. 6), based upon sensed torque converter slip (TC slip) is provided for an automated mechanical transmission system (12) including an engine (16), a mechanical transmission (14) and a torque converter (20) drivingly interposed the engine and transmission. At the beginning of a power downshift, the target gear is derived from the TC_slip, vehicle deceleration, current gear and operator throttle demand. These four vehicle conditions are parameters of a four dimensional matrix such that increasing values of each parameter promote a greater potential for skip power downshifting.

16 Claims, 5 Drawing Sheets

| INPUT | | | TARGET GEAR | | |
|---|---|---|---|---|---|
| Gear 1 | Low TC slip | Lite THL | 1 | 1 | 1 |
| | | Med THL | 1 | 1 | 1 |
| | | Full THL | 1 | 1 | 1 |
| | Hi TC slip | Lite THL | 1 | 1 | 1 |
| | | Med THL | 1 | 1 | 1 |
| | | Full THL | 1 | 1 | 1 |
| Gear 2 | Low TC slip | Lite THL | 1 | 1 | 1 |
| | | Med THL | 1 | 1 | 1 |
| | | Full THL | 1 | 1 | 1 |
| | Hi TC slip | Lite THL | 1 | 1 | 1 |
| | | Med THL | 1 | 1 | 1 |
| | | Full THL | 1 | 1 | 1 |
| Gear 3 | Low TC slip | Lite THL | 2 | 2 | 2 |
| | | Med THL | 2 | 2 | 2 |
| | | Full THL | 2 | 2 | 2 |
| | Hi TC slip | Lite THL | 2 | 2 | 2 |
| | | Med THL | 2 | 2 | 2 |
| | | Full THL | 2 | 1 | 1 |
| Gear 4 | Low TC slip | Lite THL | 3 | 3 | 3 |
| | | Med THL | 3 | 3 | 3 |
| | | Full THL | 3 | 3 | 3 |
| | Hi TC slip | Lite THL | 3 | 3 | 2 |
| | | Med THL | 3 | 2 | 2 |
| | | Full THL | 3 | 2 | 1 |
| | | | Lo Decel | Mid Decel | Hi Decel |

*FIG. 6*

TORQUE CONVERTER SLIP RATE BASED SKIP POWER DOWNSHIFT CONTROL STRATEGY

BACKGROUND OF THE INVENTION

1. Related Applications

This application is related to co-pending U.S. patent applications:

Ser. No. 07-698,745 now U.S. Pat. No. 5,109,721 entitled RANGE SHIFTING ONLY FAULT TOLERANCE METHOD/SYSTEM;

Ser. No. 07-697,813 now U.S. Pat. No. 5,109,729 entitled THROTTLE CONTROL FAULT DETECTION AND TOLERANCE METHOD/SYSTEM;

Ser. No. 07-697,384 now U.S. Pat. No. 5,099,711 entitled TOOTH BUTT/BUZZ CONTROL METHOD SYSTEM;

Ser. No. 07-698,752 now U.S. Pat. No. 5,136,897 entitled SMOOTH UPSHIFT CONTROL METHOD/SYSTEM;

Ser. No. 07-698,751 now U.S. Pat. No. 5,136,897 entitled COMPOUND POWER DOWNSHIFT METHOD/SYSTEM; and Ser. No. 07-698,017 entitled DRIVELINE TORQUE LIMIT CONTROL STRATEGY-USING SAE J1922 TYPE ENGINE CONTROL, all filed the same day, May 9, 1991, and assigned to the same assignee, Eaton Corporation, as this application.

2. Field of the Invention

The present invention relates to a control system and control method for controlling the operation of an automated mechanical transmission system, preferably of the type including an engine, a torque converter, a lock-up/disconnect clutch assembly, a power synchronizer assembly and a mechanical transmission.

In particular, the present invention relates to a control system/method for an automated transmission system as described above wherein the selection of a target gear during power downshifts is a function of several parameters including torque converter slip, vehicle deceleration, throttle position and currently engaged gear ratio.

2. Description of the Prior Art

Mechanical transmission systems of the compound range, splitter or combined range and splitter type are well known in the prior art as may be seen by reference to U.S. Pat. Nos. 4,788,889; 4,754,665 and 4,735,109, the disclosures of which are incorporated by reference.

Automatic mechanical transmission systems comprising mechanical transmissions and controls and actuators to automatically shift same, usually electronically controlled in accordance with sensed inputs and predetermined logic rules, are known. Examples of such systems may be seen by reference to U.S. Pat. Nos. 4,648,290; 4,595,986; 4,527,447; 4,711,141; 4,792,901; 4,361,060; 4,140,031 and 4,081,065, the disclosures of which hereby incorporated by reference. Such systems may also be seen by reference to SAE Paper No. 831776 titled "AUTOMATED MECHANICAL TRANSMISSION CONTROLS", the disclosure of which is hereby incorporated by reference.

Fault tolerance logic routines for automatic transmissions are known as may be seen by reference to U.S. Pat. Nos. 4,922,425; 4,849,899 and 4,899,279, the disclosures of which are hereby incorporated by reference.

Automatic transmission systems including a torque converter drivingly interposed a drive engine and a mechanical change gear transmission and/or including torque converter bypass or lock-up devices are also known as may be seen by reference to U.S. Pat. Nos. 3,593,596; 4,261,216; 4,271,724; 4,351,205 and 4,375,171, the disclosures of which are hereby incorporated by reference.

Automatic mechanical transmission systems utilizing power synchronizer devices, i.e. devices independent of engine speed to provide input shaft braking and acceleration, and not manipulation of engine speed, to synchronize the transmission jaw clutch members are known in the prior art. Examples of such systems may be seen by reference to U.S. Pat. Nos. 3,478,851, 4,023,443; 4,140,031 and 4,614,126, the disclosures of which are hereby incorporated by reference.

Automatic mechanical transmission systems having a power synchronizer and also having a torque converter drivingly interposed a drive engine and the transmission input shaft, and including a torque converter lock-up/disconnect clutch assembly, are known. Examples of such systems may be seen by reference to U.S. Pat. Nos. 4,784,019 and 4,860,861 and S.A.E. Paper No. 881830 entitled "THE EATON CEEMAT (CONVERTER ENHANCED ELECTRONICALLY MANAGED AUTOMATIC TRANSMISSION)", the disclosures of which are hereby incorporated by reference.

Such transmission systems provide an automatic mechanical transmission system utilizing a mechanical change gear transmission of a structure identical or substantially identical to the structure of transmissions intended for manual usage, providing the advantages of a torque converter for vehicle start-ups and the advantages of nonslipping connection between the engine and transmission at higher vehicle speeds/gear ratios and providing relatively rapid synchronization of the transmission positive jaw clutches. By providing an automatic mechanical transmission system based upon the same, or substantially the same, mechanical change gear transmission utilized for manual transmission systems, manufacturing, inventory and maintenance cost savings are obtained. To the transmission is added, if necessary, shifting mechanisms suitable for automatic control by solenoids or the like. An example of such a shifting mechanism may be seen by reference to above-mentioned U.S. Pat. Nos. 4,361,060 and 4,899,607 and U.S. Pat. Nos. 4,873,881; 4,722,237; and 4,445,393, the disclosures of which are hereby incorporated by reference. A power synchronizer mechanism as disclosed in above-mentioned U.S. Pat. Nos. 4,614,126; 3,478,851 or 4,023,443 is also added for synchronizing the transmission positive jaw clutches.

A torque converter is drivingly interposed the drive engine and transmission. A torque converter lock-up and disconnect clutch structure is provided comprising a first and a second separate, independently operable, clutches, preferably friction clutches, for coupling the torque converter driven member or turbine to the transmission input shaft and for coupling the torque converter input or impeller (i.e. the engine output) to the transmission input shaft, respectively.

The torque converter is drivingly interconnected between the engine and transmission only when the first coupling is engaged and the second disengaged. The torque converter is locked-up, i.e. the turbine driven directly by the engine, when the second clutch is engaged. The transmission is driven directly from the engine, whenever the second clutch is engaged simultaneously with the first clutch.

When the first coupling is disengaged, regardless of the condition of the second coupling, the transmission input shaft is disconnected from the engine torque and also from the inertia of the torque converter and from the inertia of the second coupling allowing the jaw clutches to be easily disengaged, the power synchronizer mechanism to act quickly due to relatively low inertia on the input shaft and also allowing a selected gear to be pre-engaged with the vehicle at rest and in the drive condition.

Electronic and other engine fuel control systems wherein the fuel supplied to the engine may be modulated to provide a desired engine speed, regardless of the operators setting of the throttle pedal, are known in the prior art. Such systems may be seen by reference to above-mentioned U.S. Pat. Nos. 4,081,065; 4,361,060 and 4,792,901 and by reference to the SAE J1922 electronic engine control standards and related standards SAE J1708, J1587 and J1843, the disclosures of which are incorporated herein by reference.

With automated transmission systems of the type described, i.e. derived from a manual mechanical transmission which must interrupt torque during a shift, a primary objective of the control system is to minimize the torque interrupt period, especially during power downshift conditions. Therefore the control strategy must determine a proper gear ratio (i.e. target gear) prior to committing to a shift such that unnecessary additional shifting can be minimized, which may result in a transmission skip power downshift.

Automated mechanical transmission systems having skip downshift logic routines are known in the Prior art as may be seen by reference to U.S. Pat. Nos. 4,576,065, 4,852,006 and 4,916,979, the disclosures of which are incorporated by reference and by reference to above-mentioned S.A.E. Paper No. 831776.

SUMMARY OF THE INVENTION

In accordance with the present invention, the drawbacks of the prior art are overcome or minimized by the provision, in an automated mechanical transmission system of the type described, of control strategy, based upon measured torque converter slip, for determining the proper target gear ratio during power downshift conditions, which may involve a single or multiple skip power downshift, to minimize unnecessary additional shifting and to minimize the periods of torque interruption.

The above is accomplished, preferably in an automatic mechanical transmission system based upon a mechanical change gear transmission to which is added shifting mechanisms suitable for automatic control, a power synchronizer mechanism as disclosed in above-mentioned U.S. Pat. Nos. 4,614,126, a torque converter drivingly interposed the drive engine and transmission and a torque converter lock-up and disconnect clutch structure by the provision of means by which the slip across the torque converter can be measured. The degree of slip across the torque converter relates directly with the applied engine torque, and applied torque is used as a parameter in determining the appropriate target gear during a power downshift, which may result in a transmission, single or multiple, skip downshift.

Depending on the specific characteristics of the torque converter (TC), the applied engine torque is proportional to the slip across the torque converter.

The slip across the torque converter (TC_slip) is defined to be:

$$TC\_slip = TC\ input\ speed - TC\ output\ speed.$$

One of the conventional constants that describe the performance of a torque converter is called the Capacity Factor (K) and is defined as follows:

$$K = \frac{(TC\ slip)}{(Input\ torque)} .5,$$

therefore;

$$Input\ torque = \frac{(TC\ slip\ 2)}{K}.$$

At the beginning of a downshift, the target gear is derived from the TC_slip, vehicle deceleration, current gear and operator throttle demand. These four vehicle conditions are parameters of a four dimensional matrix such that increasing values of each parameter promote a greater potential for skip power downshifting.

Accordingly, it is an object of the present invention to provide a new and improved automatic mechanical transmission system utilizing a power synchronizer, a torque converter drivingly interposed the engine and mechanical transmission and further utilizing an improved torque converter lock-up and disconnect clutch structure.

Another object of the present invention is to provide control logic, based at least in part upon sensed slip across a torque converter ($TC_{13}$ slip), for selecting a target gear in power downshift conditions.

These and other objects and advantages of the present invention will become apparent from a reading of the description of the preferred embodiment taken with the drawings.

BRIEF DESCRIPTION OF THE DRAWINGS

FIG. 6 is a symbolic representation, in control matrix format, of the control logic of the present invention.

DESCRIPTION OF THE PREFERRED EMBODIMENT

Figure 1:
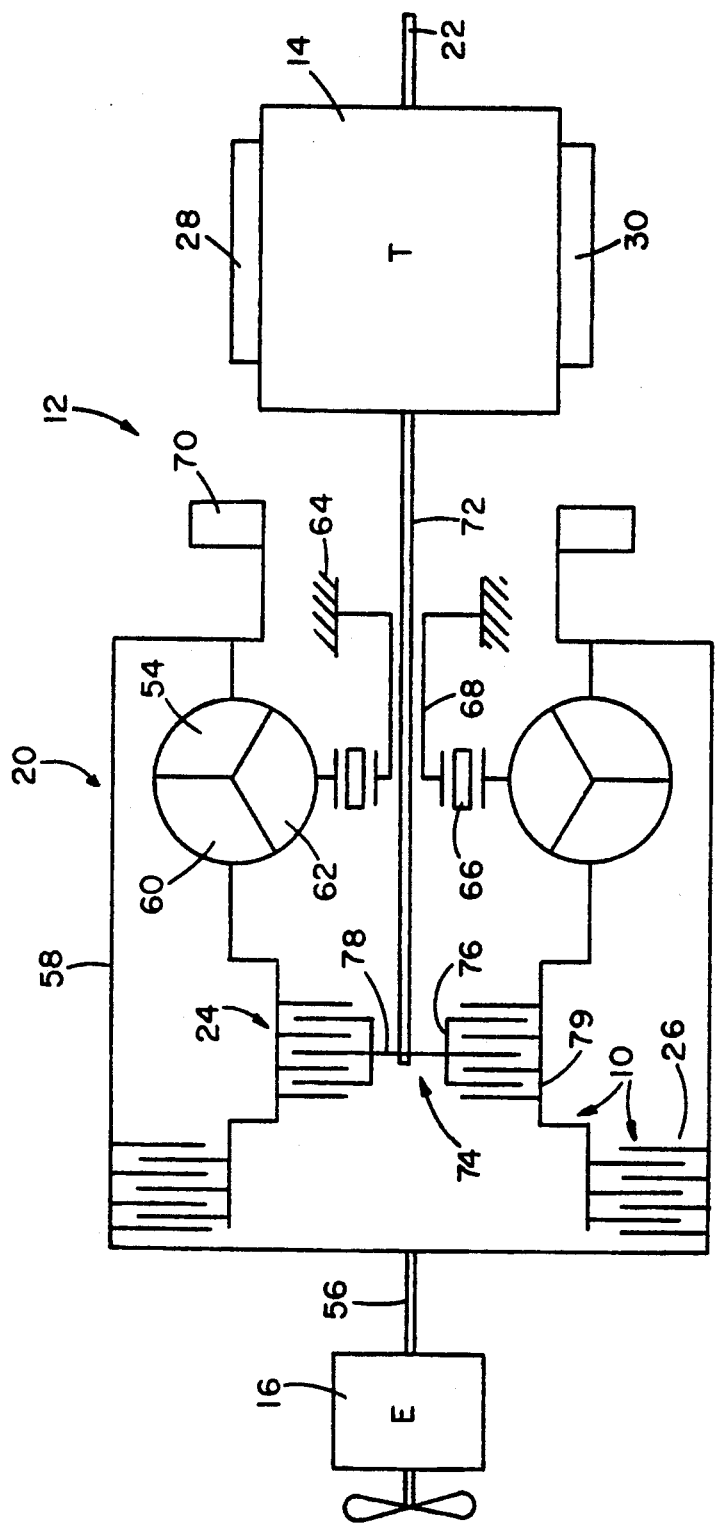
FIG. 1 is a schematic view of the torque converter and torque converter disconnect and bypass clutch structure of the present invention.

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly", refer to directions towards and away from, respectively, the geometric center of the device and designated parts thereof. The above applies to the words above specifically mentioned, derivatives thereof and words of similar import.

As used herein a "lower gear ratio" or "lower drive ratio" will refer to a gear or drive ratio having a higher ratio of input shaft speed to output shaft speed. For example, second (2nd) gear is lower than third (3rd) gear and the shift from third gear to second gear is a downshift. Similarly, a shift directly from third gear to first gear is a skip downshift wherein one ratio (i.e. 2nd speed) is skipped. A shift directly from fourth speed to first speed is a multiple skip downshift wherein two ratios (third and second) are skipped. A "power downshift" is a downshift occurring with the throttle pedal at least partially (often fully) depressed.

Figure 2:
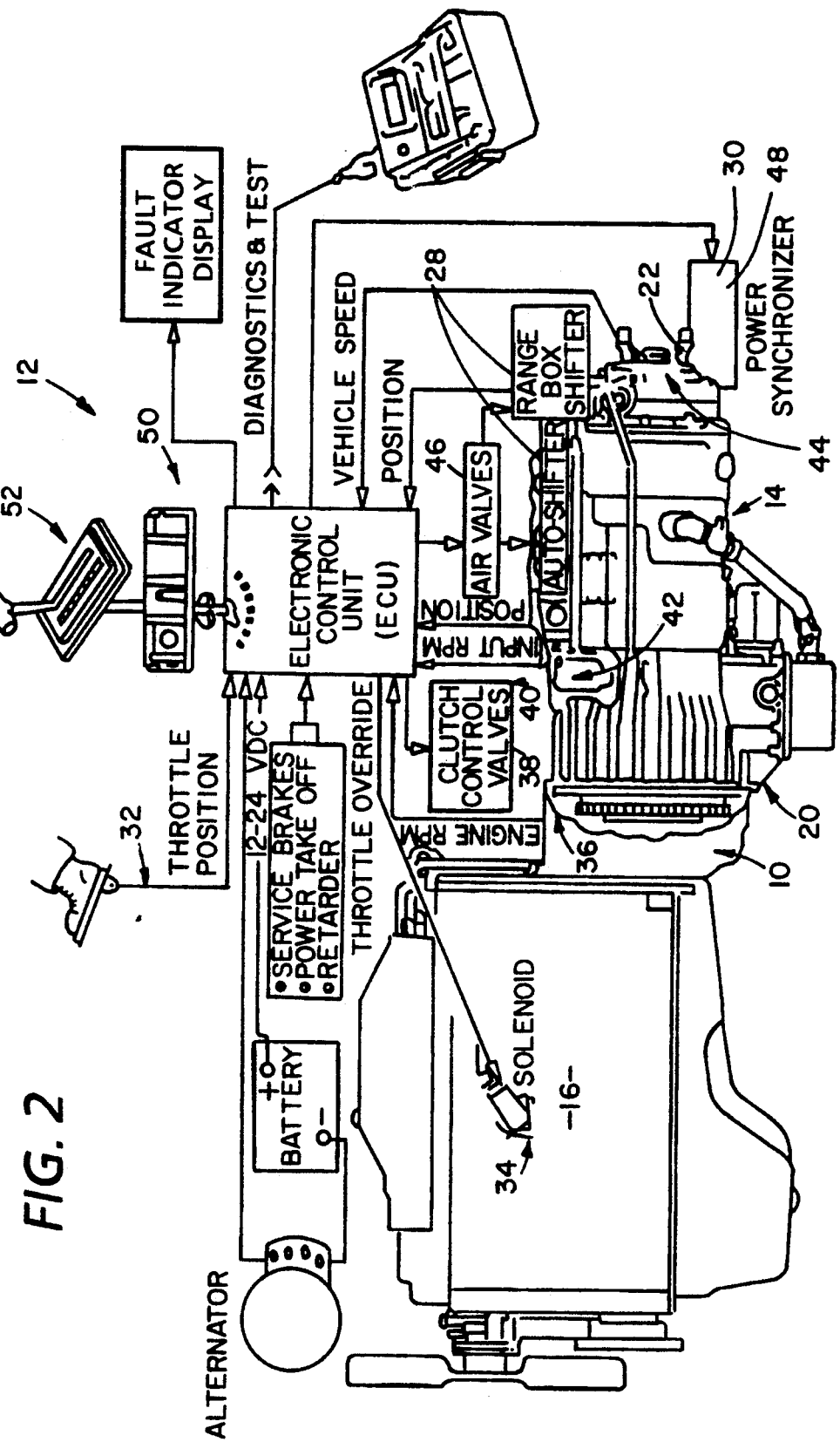
FIG. 2 is a schematic illustration of the automatic mechanical transmission system of the present invention.
Figure 3:
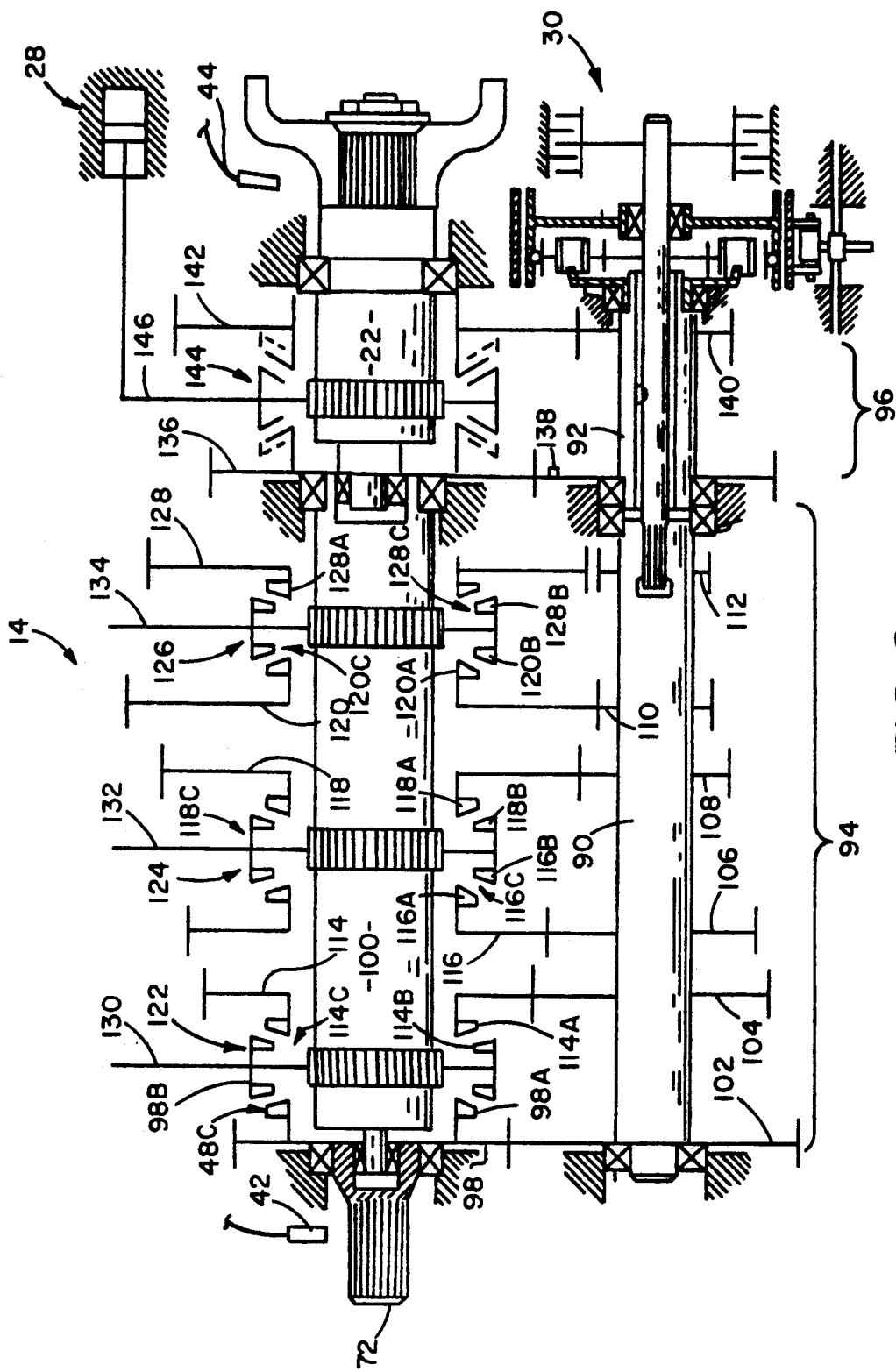
FIG. 3 is a partial view, in section, of the automatic mechanical transmission system of the present invention.

The torque converter lock-up and disconnect clutch assembly 10 and an automatic mechanical transmission system 12 utilizing same, of the present invention, are schematically illustrated in FIGS. 1, 2 and 3. The term "automatic mechanical transmission system" as used herein, shall mean a system comprising at least a throttle device controlled heat engine 16, a multi-speed jaw clutch type change gear transmission 14, a nonpositive coupling device such as a master friction clutch and/or a fluid coupling 10/20 interposed the engine and the transmission and a control unit 50 for automatically controlling same. Such systems will, of course, also include sensors and/or actuators for sending input signals to and/or receiving command output signals from the control unit.

Control systems/methods for such automated mechanical transmission systems which process input signals according to predetermined logic rules to determine the need/desirability for an upshift or downshift from a currently engaged gear ratio are well known in the prior art, see, for example, above-mentioned U.S. Pat. Nos. 4,361,060; 4,527,447 and 4,595,986. Typically, two or more control parameters such as engine speed, gear ratio, throttle position and/or transmission input-/output shaft speed, are utilized to determine if an upshift or downshift from a currently engaged gear ratio is required and/or desirable.

If the throttle pedal is at least partially depressed, depressed to at least a predetermined reference, at the time when a downshift is required, then a power downshift is required.

While the present invention is particularly well suited for use in connection with transmission systems having a torque converter and torque converter lock-up/disconnect clutch, the invention is also applicable to transmission systems having a standard torque converter without a lock-up, bypass and/or disconnect clutch associated therewith.

The automatic mechanical transmission system 12 of the present invention is intended for use on a land vehicle, such as a heavy duty truck, but is not limited to such use. The automatic mechanical transmission system 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle component such as the differential of a drive axle, a transfer case, or the like as is well known in the prior art.

As will be discussed in greater detail below, the torque converter lock-up and disconnect clutch assembly 10 includes two separate, independently engageable clutches, preferably friction clutches, a torque converter disconnect clutch 24 and a torque converter lock-up or bypass clutch 26. The transmission 14 includes a transmission operating mechanism 28 which is preferably in the format of a pressurized fluid actuated shifting assembly of the type disclosed in above-mentioned U.S. Pat. No. 4,445,393. The transmission also preferably includes a power synchronizer assembly 30 which may be of the type illustrated and disclosed in above-mentioned U.S. Pat. Nos. 3,478,851, 4,023,443 or 4,614,126.

The present invention is also applicable to automated mechanical transmission systems not including a power synchronizer assembly.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30.

The throttle control 34 may simply be an override device to reduce ("dip") fuel to the engine to a set or variable level regardless of the operator's positioning of the throttle pedal. In the case of control conforming to above-mentioned SAE J1922 or a similar standard, the fueling of the engine may vary as necessary to obtain and/or maintain a desired engine speed.

The above-mentioned devices supply information to and/or accept commands from an electronic central processing unit (ECU) 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D, $D_L$) modes of operation of the vehicle. Typically, the D mode of operation is for on-highway vehicle travel while the $D_L$ mode of operation is for off-road operation.

Typically, the system also includes various sensors, circuits and/or logic routines for sensing and reacting to sensor and/or actuator failures.

As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "THE AUTOMATION OF MECHANICAL TRANSMISSIONS" published proceedings of a joint IEEE/SAE conference entitled International Congress 20 on Transportation Electronics, IEEE Catalog Number 84CH1988-5, the disclosure of which is hereby incorporated by reference.

As is well known in the operation/function of electronic control units, especially microprocessor based ECUs, the various logic functions can be performed by discrete hardwired logic units or by a single logic unit operating under different portions or subroutines of the control system logic rules (i.e. the software).

A more detailed schematic illustration of the torque converter 20 and torque converter lock-up and disconnect clutch assembly 10 drivingly interposed engine 16 and automatic change gear transmission 14 may be seen by reference to FIG. 1. The torque converter assembly 20 is conventional in that it includes a fluid coupling of the torque converter type having an impeller 54 driven by the engine output or crank shaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28 and/or power synchronizing mechanism 30 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. At above a given vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged.

Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

The compound transmission 14 is illustrated in in greater detail in FIG. 3 and is of the type wherein the main section countershaft or countershafts 90 are coaxially aligned with the auxiliary section countershaft or countershafts 92. Transmission 14 is of a relatively standard design and is preferably of the twin countershaft type only one of which countershafts in the main and auxiliary sections, 94 and 96, respectively, is shown. Examples of such transmissions having coaxially aligned main section and auxiliary section countershafts may be seen by reference to U.S. Pat. Nos. 3,105,395 and 3,138,965, the disclosures of which are incorporated by reference.

Transmission 14 includes input shaft 72 to which member 78 is fixed for rotation therewith and which additionally carries input gear 98 nonrotatably attached thereto. Main section countershaft 90 is substantially parallel to mainshaft 100 and is provided with countershaft gears 102, 104, 106, 108, 110 and 112 fixed for rotation therewith. A plurality of mainshaft gears, also called ratio gears, 114, 116, 118 and 120, surround the mainshaft and are selectively clutchable thereto, one at a time, by double sided positive jaw clutch collars 122, 124 and 126. Jaw clutch collar 122 may also clutch the input shaft 72 directly to the mainshaft 100 while clutch collar 126 may clutch reverse mainshaft gear 128 to the mainshaft.

The mainshaft gears 114, 116, 118 and 120 circle the mainshaft and are in continuous meshing engagement with, and are preferably supported by, opposed pairs of countershaft gears 104, 106, 108 and 110 which mounting means and the special advantages resulting therefrom are explained in greater detail in above-mentioned U.S. Pat. Nos. 3,105,395 and 3,335,616. Reverse mainshaft gear 128 is in continuous meshing engagement with countershaft gear 112 by means of conventional intermediate idler gears (not shown). The forwardmost countershaft gear 102 is continuously meshed with and driven by input gear 98 for causing rotation of countershaft 90 whenever the input gear is rotatably driven.

Clutch collar 122 carries positive jaw clutch teeth 98b and 114b which are engageable with clutch teeth 98a and 114a, respectively, to define positive jaw clutches 98c and 114c, respectively. Clutch collar 124 carries positive jaw clutch teeth 116b and 118b which are engageable with jaw clutch teeth 116a and 118a, respectively, to define positive jaw clutches 116c and 118c, respectively. Jaw clutch collar 126 carries jaw clutch teeth 120b and 128b which are positively engageable with jaw clutch teeth 120a and 128a, respectively, to define positive jaw clutches 120c and 128c, respectively.

As is known in the prior art, each of the clutch collars are preferably directly or indirectly splined to the mainshaft for rotation therewith and axial movement relative thereto. Other mounting means for the clutch collars are known in the prior art and are intended to be included within the scope of the present invention. Each of the clutch collars 122, 124, and 126 is provided with means for receiving a shift fork or shift yoke 130, 132 and 134, respectively, whereby the clutch collars are axially moved, one at a time only, from the positions illustrated in FIG. 3 by the actuator 28.

The auxiliary transmission section 96 includes output shaft 22 which is preferably coaxial with input shaft 72 and mainshaft 100 and is supported for rotation in a transmission housing by means of bearings. The auxiliary section also includes an auxiliary section countershaft 92 supported for rotation in the housing by means of bearings. Fixed for rotation with mainshaft 100 is the auxiliary section drive gear 136. Auxiliary section countershaft 92 carries auxiliary section countershaft gears 138 and 140 fixed for rotation therewith. Auxiliary section countershaft gear 138 is constantly meshed with auxiliary section input gear 136 while auxiliary section countershaft gear 140 is constantly meshed with output gear 142 which surrounds the output shaft 22. A synchronized clutch structure 144, of conventional individually synchronized jaw clutch design, is utilized to selectively clutch mainshaft 100 and auxiliary drive gear 136 directly to the output shaft 22 for a direct drive connection between the mainshaft and output shaft or to clutch output gear 142 to the output shaft 22 for a reduction drive of output shaft 22 from mainshaft 100 through countershaft 92 as is well known in the prior art. Synchronized clutch structure 144 is controlled by shift fork 146 axially moved by actuator 28.

Transmission 14 is of the range type wherein the auxiliary section ratio step (or steps) is greater than the total ratio coverage of the main section ratios appearing in all ranges. Such transmissions are well known in the prior art, see U.S. Pat. No. 4,754,665, the disclosure of which is hereby incorporated by reference.

The power synchronizer assembly 30 includes a planetary speed increasing gear set driven by the output shaft 22 independently of the rotational speed of the drive engine 16, and selectively actuatable to accelerate the rotational speed of transmission elements driven by the input shaft 72 for purposes of synchronous rotation of jaw clutch members associated with the gear ratio to be engaged. Preferably, the power synchronizer assembly 30 will also include means to decelerate the transmission elements driven by the input shaft. Deceleration of the transmission elements driven by the input shaft may also be achieved by input shaft and/or engine braking devices which will preferably be controlled by central processing unit 50.

The power synchronizer assembly 30 is driven by the vehicle through gear 142 which is driven directly or indirectly by output shaft 22 and thus the power synchronizer is not effective to accelerate the mainsection countershaft 90 when the auxiliary section is not engaged.

Details of construction and operation of the power synchronizer assembly 30 may be appreciated in greater detail by reference to above-mentioned U.S. Pat. No. 4,614,126.

Figure 4:
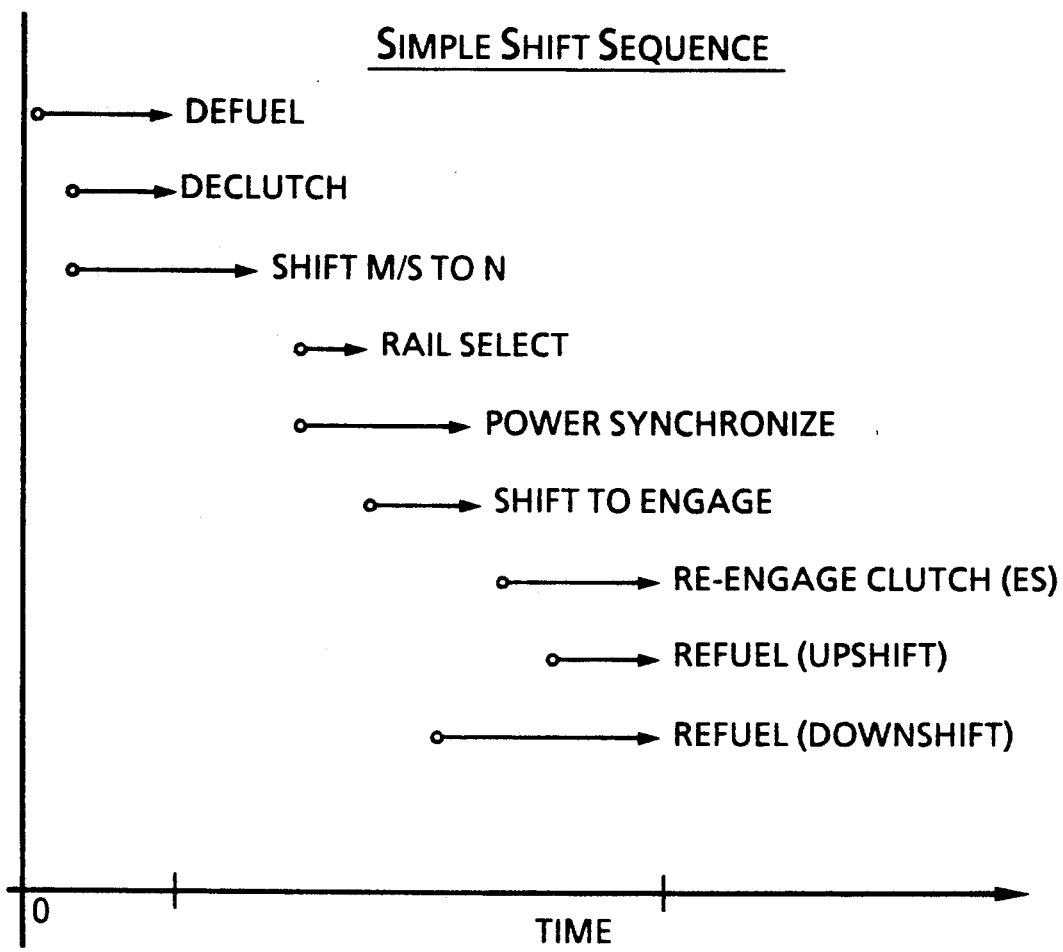
FIG. 4 is a graphical representation of a typical shift sequence for the transmission of FIG. 2.

The shift sequence for a simple shift of transmission 14 in system 12 is illustrated in FIG. 4. Assuming the ECU 50 determines that a shift from second (2nd) to third (3rd) speed is required (i.e. a simple upshift), the ECU will cause fuel controller 34 to defuel (i.e. "dip") the engine regardless of the position of the throttle pedal 32. While the engine is being defueled, the disconnect clutch (or master clutch) 24 is disengaged and shift to mainsection 94 neutral is undertaken.

Upon defueling the engine, declutching the disconnect clutch and disengaging the mainsection, the power synchronizer is actuated to cause the mainshaft gearing (in this example 3rd speed mainshaft gear 114) to rotate at a target or substantially synchronous speed relative to mainshaft 100 as determined by output shaft speed and auxiliary section 96 ratio. Output shaft speed is sensed by sensor 44 while the speed of the various mainshaft gears is a known multiple of input shaft 72 speed as sensed by sensor 42.

The rail select function can occur at any time after mainsection disengagement and mainsection reengagement in the new ratio is timed to occur as the power synchronizer is bringing the engaged gear towards target speed. Of course, for an upshift the power synchronizer is normally required to retard the speed of the input shaft and associated gearing.

Upon achieving engagement of the proper mainsection ratio, the disconnect clutch is reengaged and the engine refueled.

Typically, a simple shift can be accomplished in about 0.70 to 0.80 seconds with a disconnect (i.e. torque break) time of about 0.50 seconds.

In road conditions wherein a severe grade must be ascended by a heavily loaded vehicle, the vehicle performance in single step downshift operation is often unsatisfactory. In cases of a steep grade, vehicle may decelerate very rapidly, while the torque requirement to move and/or accelerate the vehicle may increase rapidly. Under such conditions, a shift logic which downshifts by a single step only may not provide acceptable operation as rapid repeated single downshifts may be required which tend to be objectionable, the ratio of time in gear to time out of gear is lower than desired (i.e. torque break times not minimized) and/or the allowable ratio providing maximum torque may not be selected.

The transmission system 12, being derived from a manual mechanical transmission 14, must interrupt torque during a shift. A primary objective of the control system of the present invention is to minimize this torque interrupt period. Therefore, the control strategy must determine a proper gear ratio (i.e. target gear) prior to committing to a shift such that unnecessary additional shifting can be minimized. The system possesses a means by which the slip across the torque converter can be measured or determined, namely as a function of engine speed minus input shaft speed ((TC_slip)=ES-IS), assuming that disconnect clutch 24 is fully engaged. The degree of slip across the torque converter relates directly with the applied engine torque. This measure of applied torque is used as a parameter in determining the appropriate gear during a power downshift, which may result in a transmission skip downshift.

Assuming operation of system 12 in a torque converter mode, i.e. torque converter 20 not lock-up or bypassed by clutch 26, and depending on the specific characteristics of the torque converter (TC) the applied engine torque is proportional to the slip across the torque converter.

The slip across the torque converter ($TC_{13}$ slip) is defined to be:

$TC_{13}$ slip = TC input speed - TC output speed, which may be measured as engine speed minus input shift speed, assuming clutch 24 is engaged.

One of the conventional constants that describe the performance of a torque converter is called the Capacity Factor (K) and is defined as follows:

$$K = \frac{(TC\ slip)}{(Input\ torque)^{.5}},$$

therefore;

$$Input\ torque = \frac{(TC\ slip)^2}{K}.$$

At the beginning of a power downshift, the target gear is derived from the $TC_{13}$ slip, vehicle deceleration, current gear and operator throttle demand. These four vehicle conditions are parameters of a four dimensional matrix such that increasing values of each parameter promote a greater potential for skip downshifting.

The current gear is the ratio the transmission is in prior to shift, the vehicle deceleration is the negative rate of change of the vehicle speed prior to the shift (usually sensed as output shaft speed (OS)); throttle demand is the engine throttle request from the operator (sensor 32) and the target gear is the gear required at the end of the shift.

The four dimensional control strategy matrix of the present invention is symbolically illustrated in FIG. 6.

Figure 5:
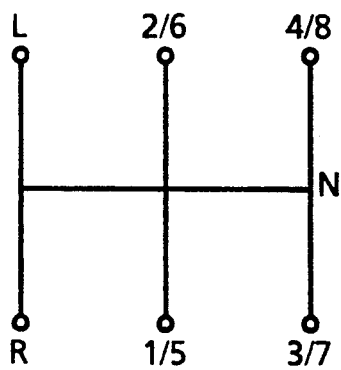
FIG. 5 is a symbolic representation of the shift pattern for the transmission of FIG. 3.

The torque converter modes are typically the lower ratios such as first (1st), second (2nd), third (3rd) and fourth (4th) speeds as seen in FIG. 5. Typically, a downshift from 1st to low will only occur if manually requested by the operator, accordingly, automatic downshifts from 1st will not occur and downshifts from 2nd gear are limited to downshifts to 1st gear ratio.

In third (3rd) gear, at power downshift conditions of (i) relatively high torque converter slip (i.e. (TC_slip)->Ref$_{SLIP-1}$), (ii) full throttle and (iii) medium to high vehicle deceleration (i.e. dOS/dt>REF$_{DEC-1}$), a skip power downshift from third (3rd), to first (1st) speed gear ratio will be commanded by ECU 50.

In fourth (4th) gear, at power downshift conditions of (i) medium or high torque converter slip (i.e. TC_slip)->Ref$_{SLIP-2}$), (ii) medium to full throttle and (iii) medium to high vehicle deceleration, a skip power downshift from fourth (4th) to second (2nd) speed gear ratio will be commanded and at full throttle and high vehicler deceleration (i.e. dOS/dt>Ref$_{DEC-2}$ where Ref$_{DEC-2}$>Ref$_{DEC-1}$), a double skip power downshift from fourth (4th) to first (1st) speed gear ratio will be commanded by ECU 50.

Accordingly, it may be seen that a control strategy, based at least in part on sensed torque converter slip for minimizing the torque break or interruption times in an automated mechanical transmission system, especially during power downshifts in the lower speed (i.e. higher mechanical advantage) ratios, has been provided.

It is understood that the above description of the preferred embodiment is by way of example only and that various modifications, substitutions and/or rearrangements of the parts are possible without departing from the spirit and the scope of the present invention as hereinafter claimed.

I claim:

1. A method for shifting a vehicular automated mechanical transmission system (12) of the type comprising a mechanical transmission (14), a fuel controlled engine (16), a fluid torque converter of known capacity factor (K factor) drivingly interposed said engine and the transmission, an operator set throttle control device (32), and a central control unit (50) effective to receive input signals indicative of the status of said transmission system including signal indicative of (i) slip across the torque converter (TC_slip), (ii) operator's setting of the throttle control device (THL), (iii) vehicle deceleration (dOS/dt) and (iv) currently engaged gear ratio, and to process same in accordance with logic rules to issue command output signals to a plurality of system actuators, said method characterized by:

sensing for a required power downshift, and
responding to sensing said required power downshift by determining a target gear to be shifted into as a function of torque-converter slip, throttle setting, vehicle deceleration and currently engaged gear ratio.

2. The method of claim 1 wherein a skip power downshift will be commanded if the currently engaged gear ratio is at least third (3rd) speed, the torque converter slip exceeds a first reference value (REF$_{SLIP-1}$), throttle setting exceeds a second reference value (full throttle) and vehicle deceleration is greater than a third reference value (dOS/dt>REF$_{DEC-1}$).

3. The method of claim 1 wherein said torque converter includes an input element (54) adapted to be driven by said engine (16) and an output element (60) adapted to drive an input shaft (72) of said transmission.

4. The method of claim 2 wherein said torque converter includes an input element (54) adapted to be driven by said engine (16) and an output element (60) adapted to drive an input shaft (72) of said transmission.

5. The method of claim 3 wherein said signals indicative of slip across said torque converter include signals indicative of the rotational speeds of said engine (ES) and of said input shaft (IS).

6. The method of claim 4 wherein said signals indicative of slip across said torque converter include signals indicative of the rotational speeds of said engine (ES) and of said input shaft (IS).

7. The method of claims 1, 2, 3, 4, 5, or 6 further comprising a torque converter lock-up clutch (26), and wherein said determining a target gear only occurs if said lock-up clutch is not engaged.

8. The method of claims 1, 2, 3, 4, 5 or 6 wherein a multiple skip downshift (4th to 1st) is commanded if said transmission is currently engaged in at least fourth speed gear, said throttle setting equals or exceeds a fourth reference (100% throttle), said vehicle deceleration is greater than a fifth reference $(dOS/dt > REF_{DEC-2} > REF_{DEC-1})$, said fourth reference corresponding to a greater deceleration than said third reference, and said torque slip exceeds said first reference $(REF_{SLIP})$.

9. A control system for shifting a vehicular automated mechanical transmission system (12) of the type comprising a mechanical transmission (14), a fuel controlled engine (16), a fluid torque converter of known capacity factor (F factor) drivingly interposed said engine and said transmission, an operator set throttle control device (32), and a central control unit (50) effective to receive input signals indicative of the status of the transmission system including signals indicative of (i) slip across said torque converter (TC_slip), (ii) operator's setting of the throttle control device (THL), (iii) vehicle deceleration (dOS/dt) and (iv) currently engaged gear ratio, and to process ame in accordance with logic rules to issue command output signals to a plurality of system actuators, said control system characterized by said logic rules including rules:

for sensing for a required power downshift, and for responding to sensing said required power downshift by determining a target gear to be shifted into as a function of torque-converter slip, throttle setting, vehicle deceleration and currently engaged gear ratio.

10. The control system of claim 9, said logic rules further include rules whereby a skip power downshift will be commanded if the currently engage gear ratio is at least third (3rd) speed, the torque converter slip exceeds a first reference value $(REF_{SLIP-1})$, throttle setting exceeds a second reference value (full throttle) and vehicle deceleration is greater than a third reference value $(dOS/dt > REF_{DEC-1})$.

11. The control system of claim 9 wherein said torque converter includes an input element (54) adapted to be driven by said engine (16) and an output element (60) adapted to drive an input shaft (72) of said transmission.

12. The control system of claim 10 wherein said torque converter includes an input element (54) adapted to be driven by said engine (16) and an output element (60) adapted to drive an input shaft (72) of said transmission.

13. The control system of claim 11 wherein said signals indicative of slip across said torque converter include signals indicative of the rotational speeds of said engine (ES) and of said input shaft (IS).

14. The control system of claim 12 wherein said signals indicative of slip across said torque converter include signals indicative of the rotational speeds of said engine (ES) and of said input shaft (IS).

15. The control system of claims 9, 10, 11, 12, 13 or 14 further comprising a torque converter lock-up clutch (26), and wherein said determining a target gear only occurs if said lock-up clutch is not engaged.

16. The control system of claims 9, 10, 11, 12, 13 or 14 wherein under said logic rules a multiple skip downshift (4th to 1st) is commanded if said transmission is currently engaged in at least fourth speed gear, throttle setting equals or exceeds a fourth reference (100% throttle), vehicle deceleration is greater than a fifth reference $(dOS/dt > REF_{DEC-2} > REF_{DEC-1})$, said fourth reference corresponding to a greater deceleration than said third reference, and said torque slip exceeds said first reference $(REF_{SLIP})$.

* * * * *